United States Patent
Yano et al.

(10) Patent No.: US 11,993,472 B2
(45) Date of Patent: May 28, 2024

(54) CLOTH TRANSFER APPARATUS

(71) Applicant: PUREX CO., LTD., Takamatsu (JP)

(72) Inventors: Makoto Yano, Takamatsu (JP);
Hiroyuki Ideue, Takamatsu (JP)

(73) Assignee: PUREX CO., LTD., Kagawa (JP)

( * ) Notice: Subject to any disclaimer, the term of this patent is extended or adjusted under 35 U.S.C. 154(b) by 656 days.

(21) Appl. No.: 17/256,791

(22) PCT Filed: Jun. 21, 2019

(86) PCT No.: PCT/JP2019/024738
§ 371 (c)(1),
(2) Date: Dec. 29, 2020

(87) PCT Pub. No.: WO2020/008915
PCT Pub. Date: Jan. 9, 2020

(65) Prior Publication Data
US 2021/0155437 A1 May 27, 2021

(30) Foreign Application Priority Data

Jul. 5, 2018 (JP) ................................. 2018-128527

(51) Int. Cl.
*B65G 9/00* (2006.01)
*B65G 19/02* (2006.01)
*D06F 67/04* (2006.01)

(52) U.S. Cl.
CPC ........... *B65G 9/008* (2013.01); *B65G 19/025* (2013.01); *D06F 67/04* (2013.01)

(58) Field of Classification Search
CPC ........ B65G 9/008; B65G 9/00; B65G 19/025; B65G 19/02; D06F 67/04; D06F 67/00
See application file for complete search history.

(56) References Cited

U.S. PATENT DOCUMENTS 3,002,635 A * 10/1961 Holland, Jr. ........... B65G 33/04
198/465.4
4,313,269 A * 2/1982 van Rumpt ............ B65G 9/002
38/143
(Continued)

FOREIGN PATENT DOCUMENTS

CN 201808920 U 4/2011
CN 102139699 A 8/2011
(Continued)

OTHER PUBLICATIONS

Oct. 22, 2021 Office Action issued in Chinese Patent Application No. 201980040937.2.
(Continued)

*Primary Examiner* — Ismael Izaguirre
(74) *Attorney, Agent, or Firm* — Oliff PLC (57) ABSTRACT

A cloth transfer apparatus allows a cloth to be attached to a traveling clamp efficiently without waste even when a corner of the cloth to be attached to the traveling clamp is specified. The cloth transfer apparatus includes: a plurality of independent traveling clamps; and a transfer rail circulating through a supply unit where a corner of the cloth is attached to the traveling clamp and a discharge unit where the cloth is delivered from the traveling clamp and allowing the traveling clamps to independently travel. In the supply unit: a branch point that allows the transfer rail to branch into a first supply rail and a second supply rail and a merge point that allows to the branched first supply rail and second supply rail to be merged.

12 Claims, 10 Drawing Sheets

(56) References Cited

U.S. PATENT DOCUMENTS

| | | |
|---|---|---|
| 5,349,768 A | 9/1994 | Ishihara et al. |
| 2007/0068433 A1 | 3/2007 | Nielsen |
| 2014/0291123 A1 | 10/2014 | Olivieri et al. |
| 2017/0335505 A1 | 11/2017 | Maejima |

FOREIGN PATENT DOCUMENTS

| | | | |
|---|---|---|---|
| CN | 204384387 U | 6/2015 | |
| CN | 104751561 A | 7/2015 | |
| DE | DD-146700 A5 * | 10/1979 | |
| EP | 0861936 A2 * | 1/1998 | |
| EP | 0982428 A1 | 3/2000 | |
| EP | 1279630 A1 * | 1/2003 | ........... B65G 19/025 |
| EP | 2045391 A2 * | 4/2009 | ............. D06F 67/04 |
| JP | H04-158899 A | 6/1992 | |
| JP | H04-112399 U | 9/1992 | |
| JP | H05-103900 A | 4/1993 | |
| JP | H06-154499 A | 6/1994 | |
| JP | 2007-511302 A | 5/2007 | |
| JP | 2013-075749 A | 4/2013 | |
| JP | 2014-188377 A | 10/2014 | |
| JP | 2016-106659 A | 6/2016 | |
| TW | I543909 B | 8/2016 | |
| WO | 2016/084401 A1 | 6/2016 | |

OTHER PUBLICATIONS

Jul. 27, 2021 Search Report issued in European Patent Application No. 19830743.1.
Sep. 3, 2019 International Search Report issued in International Patent Application No. PCT/JP2019/024738.
Feb. 19, 2020 Office Action issued in Taiwanese Patent Application No. 108121980.
Dec. 14, 2023 Office Action issued in European Patent Application No. 19830743.1.

* cited by examiner

CLOTH TRANSFER APPARATUS

TECHNICAL FIELD

The present invention relates to a cloth transfer apparatus, and more particularly to a cloth transfer apparatus for transferring a cloth in a linen cleaning facility.

BACKGROUND

The inventors of the present application have previously a cloth transfer apparatus for transferring washed clothes from a supply position to a discharge position in a linen cleaning facility (see Patent Document 1). This cloth transfer apparatus is equipped with a transfer rail circulating from the supply position to the discharge position. A plurality of traveling bodies for keeping the cloth is movable on the transfer rail.

An operator attaches (supplies) a cloth to the traveling body at the supply position and the cloth held by the traveling body is discharged (delivered) to the subsequent treatment device at the discharge position. The traveling body includes a beam that is horizontally set and a pair of chucks disposed on both left and right end portions of the beam. The cloth travels along the transfer rail while keeping a hanging posture, with the left and right corners thereof being clamped by the pair of chucks.

In the cloth transfer apparatus, the cloth is attached to the traveling body by such a procedure that the operator finds one corner of a particular side of the cloth, attach the corner to one of the pair of chucks, at the supply position, and then finds the other corner of the side to attach the other corner to the other chuck. In this case, the operator finds the other corner by pulling the cloth, causing a problem that it takes much time and effort to find the other corner.

Figure 10A:
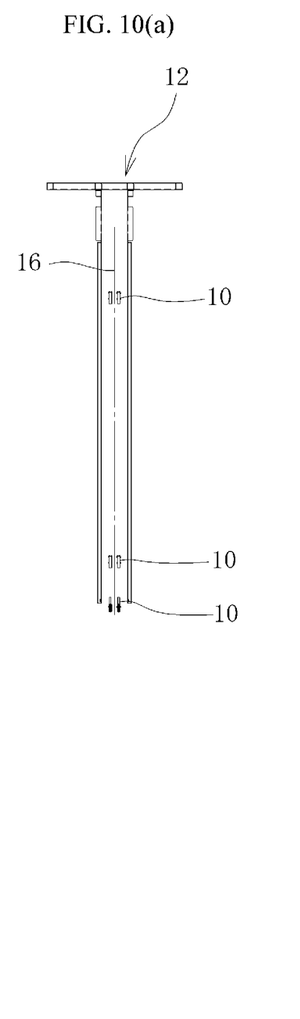
FIG. 10(a) is a front view and FIG. 10(b) is a side view.
Figure 10B:
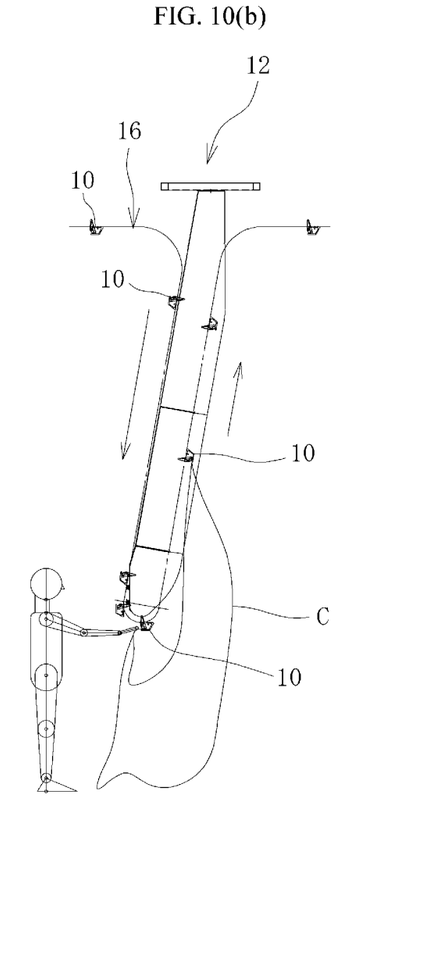

Instead of the two left and right chucks equipped to the traveling body, there is considered a transfer system in which a plurality of independent traveling clamps 10 travel on a single transfer rail 16 as shown in FIG. 10(a). In this transfer system, as shown in FIG. 10(b), the traveling clamp can rise upward immediately after the corner of the particular side of the cloth C that has been first found at the supply position is attached to a leading traveling clamp 10, and the other corner itself appears in front of the operator, so that the effort and time for finding the other corner can be substantially reduced.

CITATION LIST

Patent Literature

Patent Literature 1: JP-A-2016-106659

SUMMARY OF INVENTION

Technical Problem

Even in the above transfer system, there may be such a constraint that the corner of the cloth to be attached to the traveling clamp is specified, that is, one particular corner (e.g. right corner) always needs to be attached to the leading traveling clamp at the supply position and the other particular opposite corner (e.g. left corner) always needs to be attached to the trailing traveling clamp. In this case, if the operator first finds a corner opposite to the particular corner supposed to be first attached, it is required to conduct a troublesome procedure that: the operator releases the first-found corner, finds the other particular corner to attach to the leading traveling clamp, finds the first-found corner again to attach to the trailing traveling clamp. The act of releasing the corner that has been once found is a waste of time and effort, leading to large deterioration in the transfer efficiency.

An object of the present invention is to provide a cloth transfer apparatus that allows the operator to efficiently attach the cloth to the traveling clamp without waste even when the corner of the cloth to be attached to the traveling clamp is specified.

Solution to Problem

The cloth transfer apparatus according to the present invention comprises a plurality of independent traveling clamps and a transfer rail circulating through a supply unit where a corner of a cloth is attached to the traveling clamp and a discharge unit where the cloth is delivered from the traveling clamp and allowing the traveling clamps to independently travel thereon. The cloth transfer apparatus is provided with, in the supply unit or before or after the supply unit, a branch point that allows the transfer rail to branch into a first supply rail and a second supply rail and a merge point that allows to the branched first supply rail and second supply rail to be merged.

In a preferable embodiment of the cloth transfer apparatus according to the present invention, a first traveling clamp as the traveling clamp positioned in the first supply rail is for attaching a first corner as a particular corner of the cloth and a second traveling clamp as the traveling clamp positioned in the second supply rail is for attaching a second corner as the other particular corner of the cloth.

A preferable embodiment of the cloth transfer apparatus according to the present invention is configured in such a manner that, between the first traveling clamp and the second traveling clamp, the one to which the particular corner of the cloth has been attached, rises earlier to a waiting position directly before the merge point.

A preferable embodiment of the cloth transfer apparatus according to the present invention is configured in such a manner that particular one of the first traveling clamp and the second traveling clamp is always returned to a main line earlier, through the merge point, in a condition that the first corner of the cloth is attached to the first traveling clamp and the second corner of the cloth is attached to the second traveling clamp.

In a preferable embodiment of the cloth transfer apparatus according to the present invention, there is disposed a branch point where the transfer rail braches into a first discharge rail and a second discharge rail at a position directly before the discharge unit.

In a preferable embodiment of the cloth transfer apparatus according to the present invention, the traveling clamp is distributed into the first discharge rail and the second discharge rail at the branch point located directly before the discharge unit in consideration with the direction of front and back faces of the cloth discharged from the discharge unit.

Advantageous Effect of Invention

In the cloth transfer apparatus according to the present invention, the transfer rail branches into the first supply rail and the second supply rail inside or before the supply unit through the branch point, so that, between the right corner and left corner of the particular side of the cloth, the one that has been found earlier by the operator can be attached to the traveling clamp on the corresponding first supply rail or second supply rail. Thus, it becomes unnecessary to perform the troublesome operation that the corner that the operator has first found is released once and thereafter the released corner is again found and attached, so that the attachment of the cloth to the traveling clamp can be performed efficiently.

BRIEF DESCRIPTION OF DRAWINGS

FIG. 3 is a view illustrating a branch point disposed in a main line of the cloth transfer apparatus of FIG. 1, where

FIG. 4 is a view illustrating a merge point disposed in a main line of the cloth transfer apparatus of FIG. 1, where

FIG. 5 shows a supply unit in the cloth transfer apparatus of FIG. 1, where

FIG. 6 shows a supply unit in the cloth transfer apparatus of FIG. 1, where

FIG. 10 shows, as a comparison, a supply unit where a transfer rail is not branched into two parts, where

DESCRIPTION OF EMBODIMENTS

An embodiment of the present invention will be described in detail with reference to the drawings. A cloth transfer apparatus of this embodiment transfers a washed rectangular cloth to a next process at a hanging state, and is particularly suitable for the transfer of the cloth when the corner of the cloth to be attached to the traveling clamp is specified.

Figure 1:
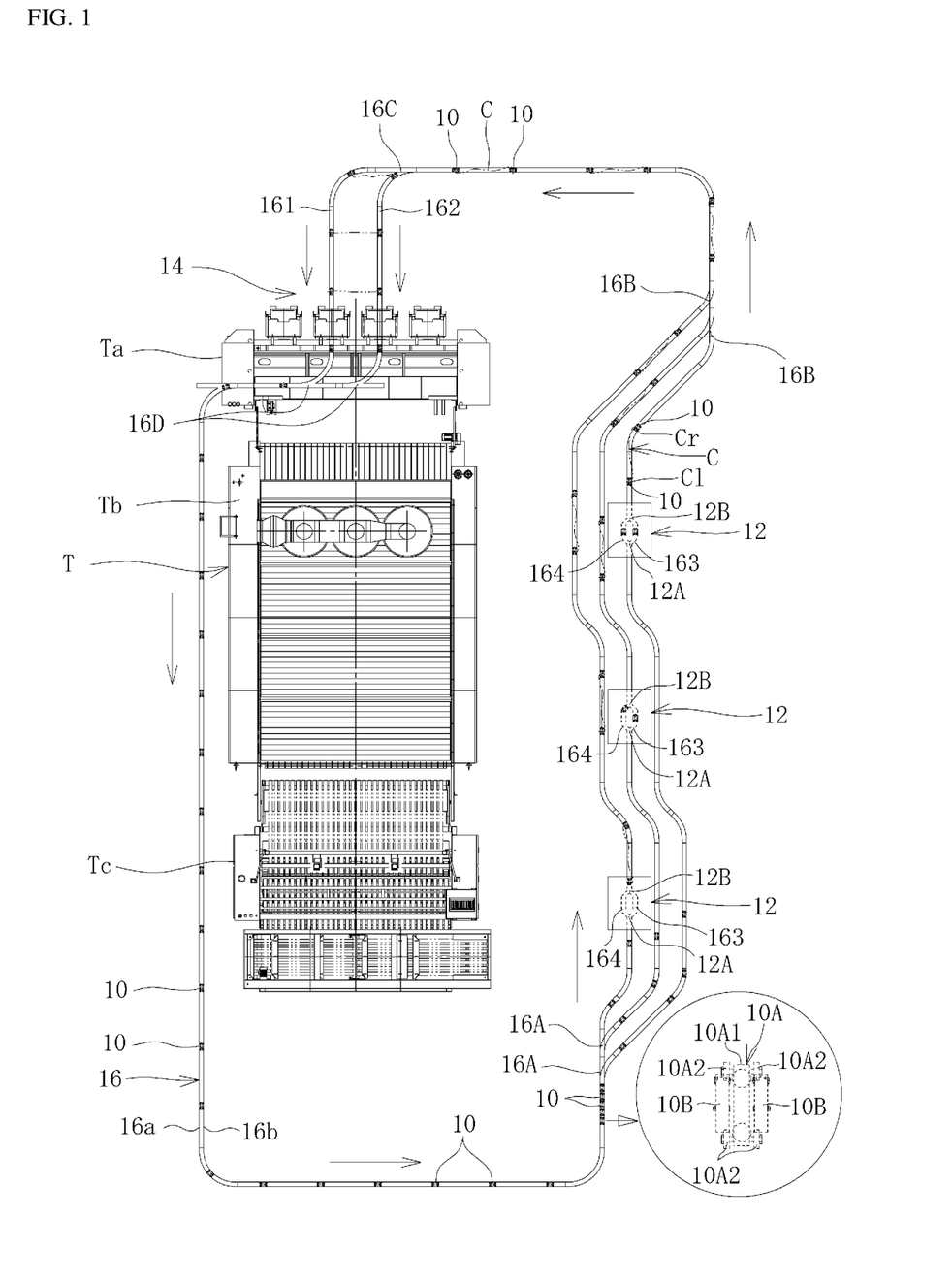
FIG. 1 is a plan view illustrating a schematic configuration of a cloth transfer apparatus according to an embodiment of the present invention.

FIG. 1 shows a schematic configuration of the cloth transfer apparatus according to the embodiment of the present invention. The cloth transfer apparatus comprises a plurality of independent traveling clamps 10, a supply unit 12 where an operator or the like attaches corners Cr, Cl of a cloth C to the traveling clamp 10, a discharge unit 14 where the cloth C held by the traveling clamp 10 is delivered (discharged) to a subsequent treatment device T, a transfer rail 16 that circulates at least through the supply unit 12 and the discharge unit 14 and allows the traveling clamps 10 to travel individually, and a control unit (not shown) that controls the whole cloth transfer apparatus inclusive of the control in the supply unit 12 and the discharge unit 14. The treatment device T comprises, for example, a cloth feeding machine Ta, a roll ironer Tb that is connected to a downstream side of the cloth feeding machine Ta, and a cloth folding machine Tc that is connected to a downstream side of the roll ironer Tb. The cloth feeding machine Ta receives the cloth C from the traveling clamp 10 and feeds the cloth C to the roll ironer Tb in the supply unit, and the roll ironer Tb irons the fed cloth C, and the cloth folding machine Tc folds the ironed cloth C.

In the supply unit 12, the operator receives the washed cloth C that has been fed from the washing process, and hangs the cloth C on the traveling clamp 10 on the transfer rail 16. In the illustrated example, there are arranged three supply units 12, but the supply units 12 may be at least one.

The traveling clamp 10 is a mobile body that travels on the transfer rail 16 and comprises a traveling unit 10A and a clamp unit 10B as shown by an enlarged view in FIG. 1. The traveling unit 10A comprises a main body 10A1, four traveling wheels 10A2 attached to the left and right positions each of front and rear ends of the main body 10A1, and guide wheels (not shown) attached to the front and rear positions of the main body 10A1. The traveling wheel 10A2 rolls on a traveling face comprised of an upward-facing flat wall of the transfer rail 16, and the guide wheel rolls along a guide face comprised of a vertical wall of the transfer rail 16. The traveling clamp 10 travels on the transfer rail 16 by the rolling of these traveling wheels 10A2 and the guide wheels.

A clamp portion 10B is hanged from the main body 10A1 of the traveling unit 10A through a stay. In the illustrated example, two clamp portions 10B are arranged adjacent to each other per one traveling clamp 10, but the clamp portions 10B may be one. The two clamp portions 10B hold the corners Cr, Cl of the cloth C in cooperation with each other. The clamp 10B is a well-known clamp and comprised of a swinging clamp pawl 10B1 and a fixed plate 10B2 facing thereto. The structure of the clamp 10B is not limited as long as it can hold and release the cloth C.

The transfer rail 16 is formed by connecting a plurality of rail members along a given route. For example, each rail member is formed by arranging a pair of channel materials 16a, 16b with an approximately C-shaped section in parallel such that their opening sides are opposed and a constant interval is formed. The rail member is not limited to such a channel material and may be a L-shaped angle material as long as it has an upward-facing flat wall constituting the above traveling face and a vertical wall constituting the guide face. Alternatively, the rail member may be a lip channel material with the channel side being oriented downward and use a pair of lip parts thereof as the traveling face. The transfer rail 16 is preferably placed, except in a particular zone such as the supply unit 12, at a sufficiently high position such that the cloth C that is held hanging downward by the traveling clamp 10 does not come into contact with the ground and the like and become dirty. The transfer rail 16 has a forcible moving area where the traveling clamp 10 is forcibly moved by a driving mechanism (not shown), and a free moving area which inclines downward and where the raveling clamp 10 is descended and moved by its own weight. An example of the driving mechanism comprises a pair of pulleys, a toothed belt mounted between the pulleys, and a driving motor for rotating the pulleys. The toothed belt circling through the driving motor engages the upper face the traveling clamp 10 for example, allowing the traveling clamp 10 to move individually along the transfer rail 16. Instead of the toothed belt, a chain may be used instead of the toothed belt.

Figure 3A:
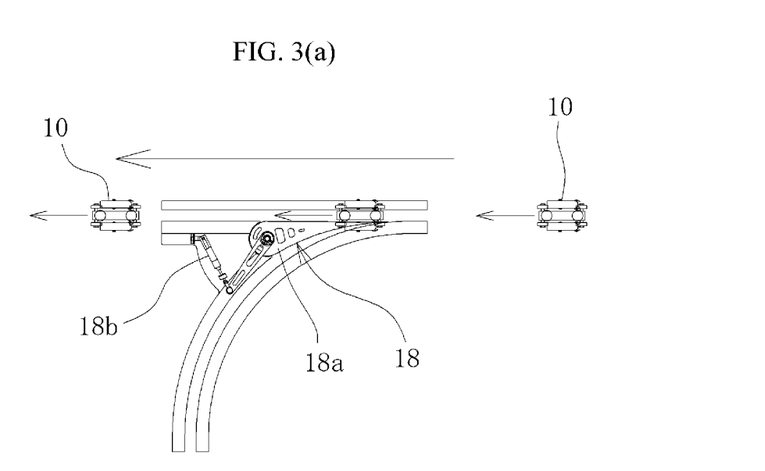
FIG. 3(a) shows a distribution of a traveling clamp to an upper pathway and FIG. 3(b) shows a distribution of a traveling clamp to a lower pathway.
Figure 3B:
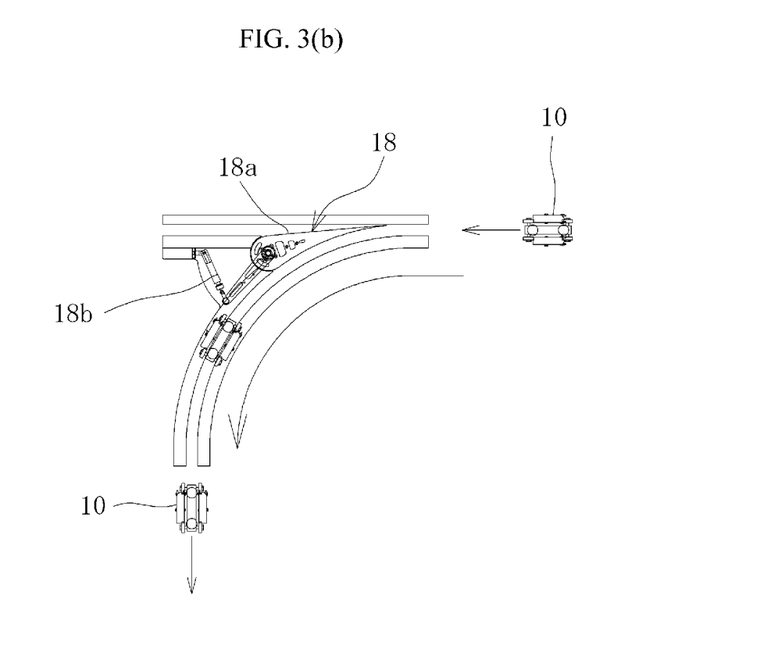
Figure 4A:
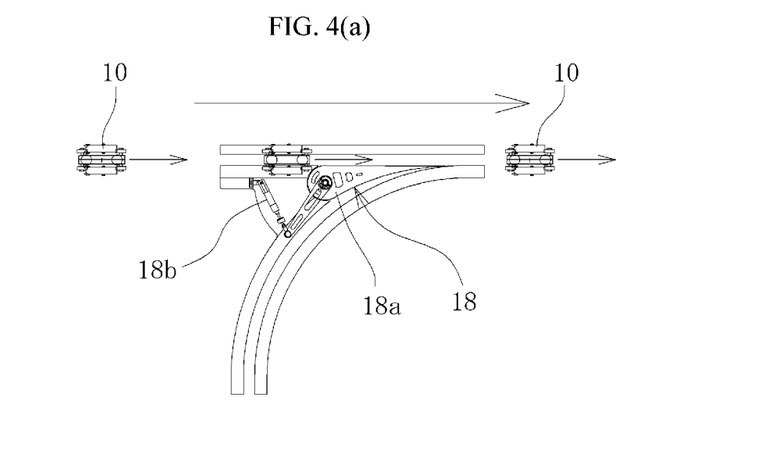
FIG. 4(a) shows a merge from an upper pathway and FIG. 4(b) shows a merge from a lower pathway.
Figure 4B:
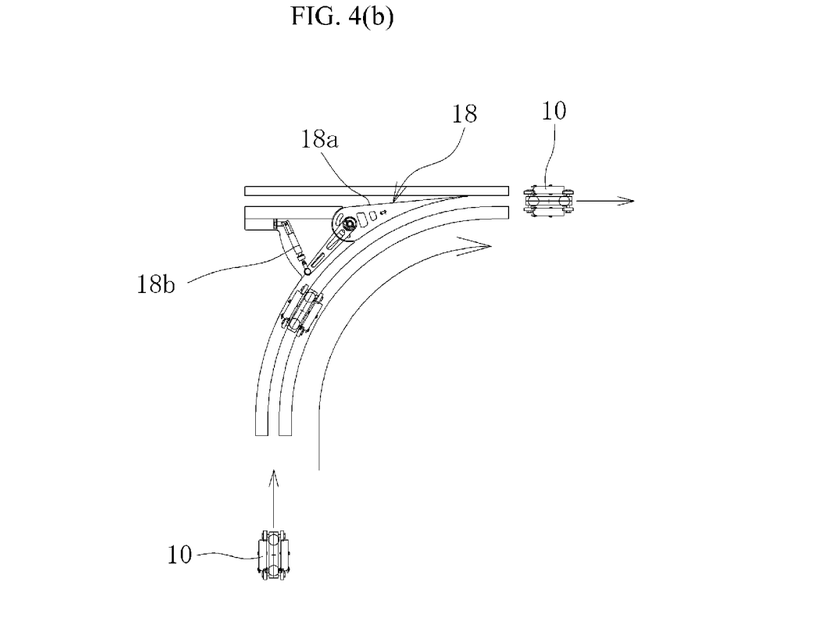

Also, the transfer rail 16 has a branch point 16A that allows the main line to branch into three routes to provide the traveling clamp 10 with the respective supply unit 12, and a merge point 16B where the branched routes are merged again. Furthermore, there is disposed a branch point 16C, directly before the discharge unit 14, that distributes the traveling clamps 10 to a first discharge rail 161 and a second discharge rail 162 on both sides, alternately or in a given order. In the transfer rail 16, there may be arranged 4 or more discharge rails (not shown) in accordance with the number of feeding points in the cloth feeding machine Ta. Moreover, a similar merge point 16D is disposed at a downstream side of the discharge unit 14. A changeover device 18 as shown in FIGS. 3 and 4 is disposed each in the branch points 16A, 16C and the merge points 16B, 16D. The changeover device 18 comprises a changeover guiding unit 18a having a tapered form and axially supported at its base end so that a top end side can pivot, and a driving means 18b that swings the changeover guiding unit 18a to change the rail to be traveled. The driving means is a cylinder in the illustrated example, but may use a motor. The changeover device 18 may be omitted in the merge points 16B, 16D. In this case, the traveling clamp 10 that arrives earlier at the merge points 16B, 16D are merged first.

Figure 2:
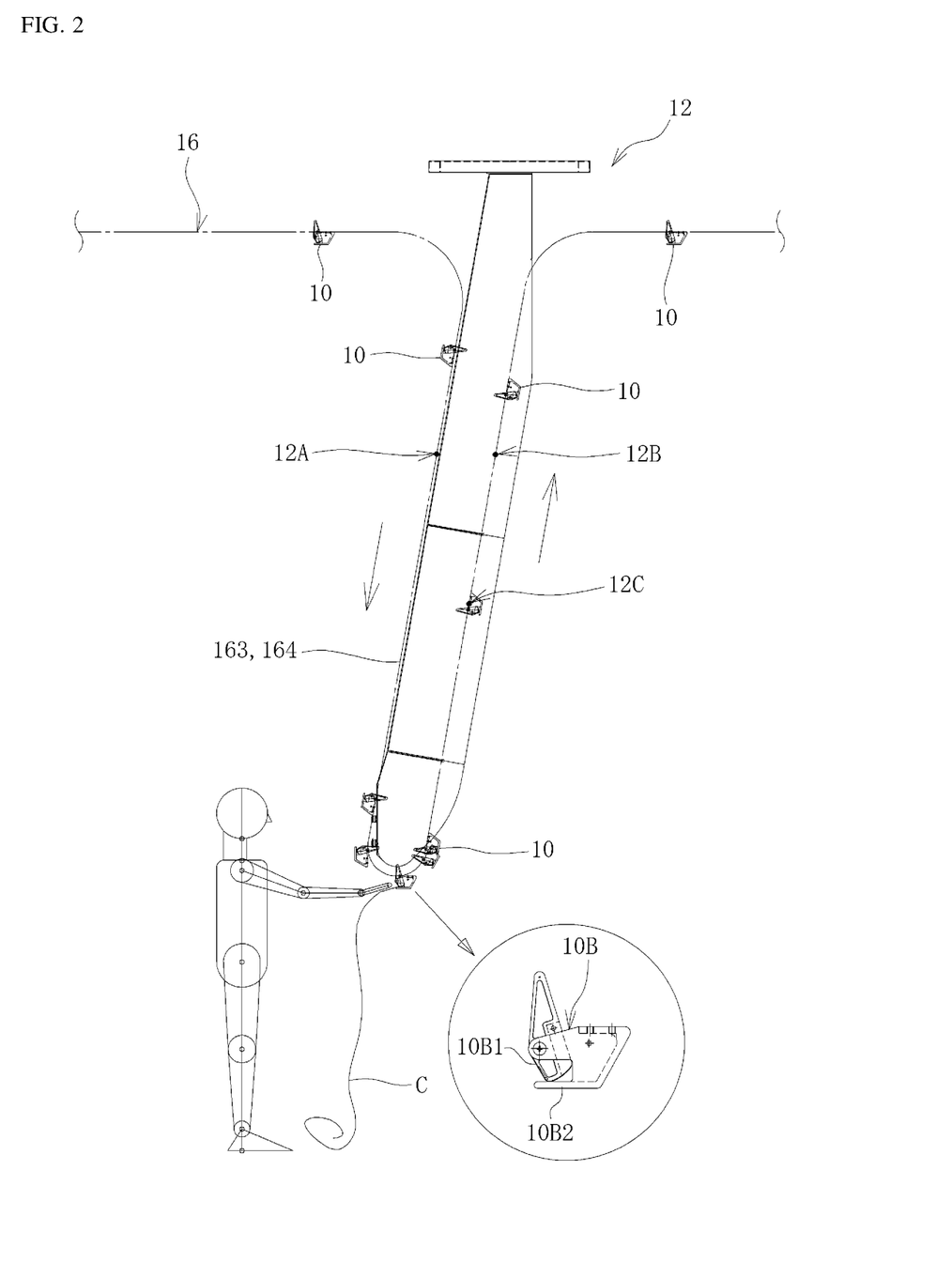
FIG. 2 is a side view of a supply unit in the cloth transfer apparatus of FIG. 1.

As shown in FIG. 2, the transfer rail 16 has an approximately U-shaped form in the side view, extending downward from the main line at a higher position to the height position of the operator's upper body and then extending upward toward the main line again, in each supply unit 12. Thus, the operator can attach the cloth C to the traveling clamp 10 in the supply unit 12.

Figure 5A:
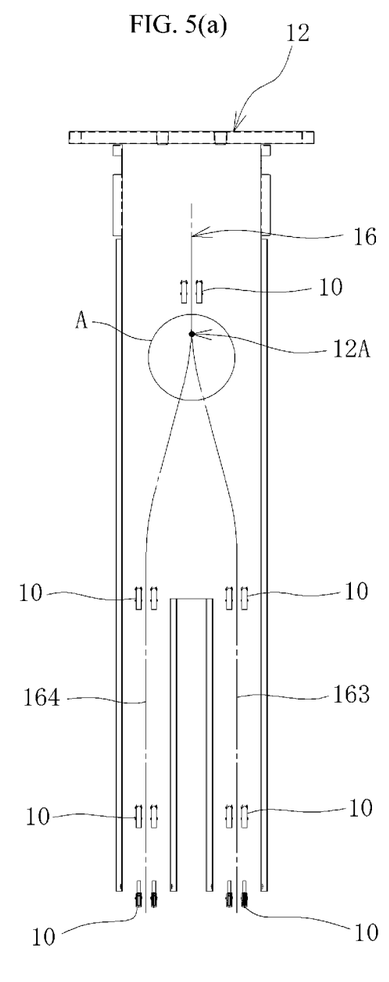
FIG. 5(a) is a front view and FIG. 5(b) is an enlarged view of the portion A in FIG. 5(a), showing the traveling clamp being distributed to a right-side first supply rail
Figure 5B:
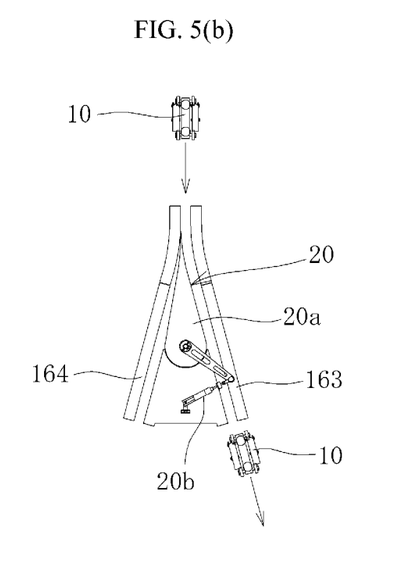
Figure 5C:
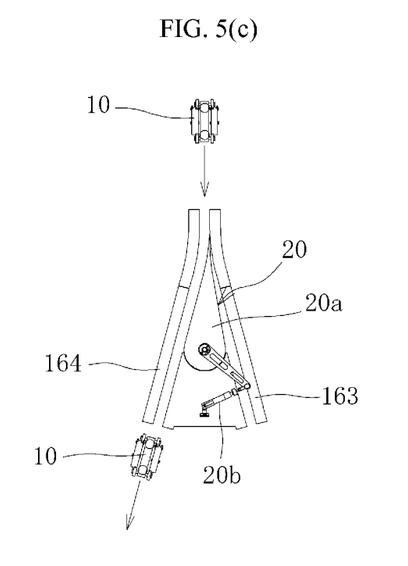
FIG. 5(c) is an enlarged view of the portion A in FIG. 5(a), showing the traveling clamp being distributed to a left-side second supply rail.
Figure 6A:
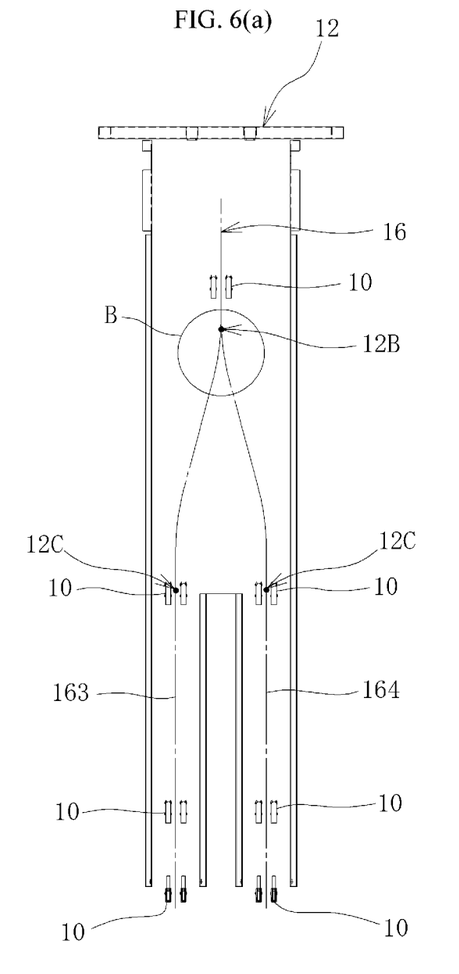
FIG. 6(a) is a front view and FIG. 6(b) is an enlarged view of the portion B in FIG. 6(a), showing the traveling clamp being merged to a left-side first supply rail.
Figure 6B:
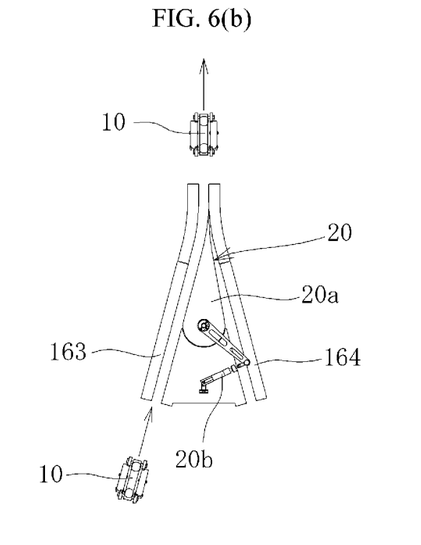
Figure 6C:
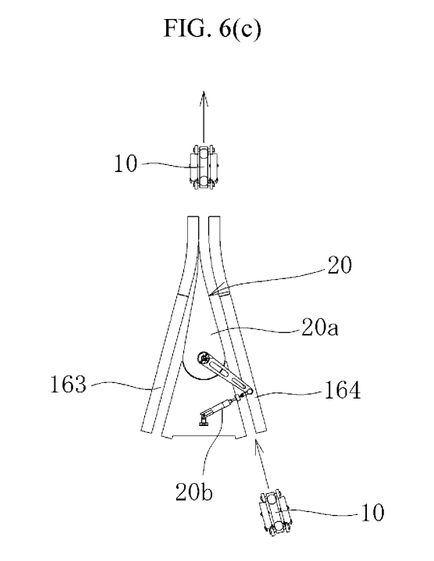
FIG. 6(c) is an enlarged view of the portion B in (a), showing the traveling clamp being merged to a right-side second supply rail.

The transfer rail 16 branches into a first supply rail 163 on the right side and a second supply rail 164 on the left side, viewing from the operator at a front-side branch point (branching position) 12A of the supply unit 12, as shown in FIG. 5, and then is merged again in a merge point (merge position) 12B on the rear side as shown in FIG. 6. A changeover device 20 is disposed each in the branch point 12A and the merge point 12B of the supply unit 12. The changeover device 20 comprises a changeover guiding unit 20a having a tapered form and axially supported at its base end so that a top end side can pivot, and a driving means 20b that swings the changeover guiding unit 20a to change the rail to be traveled. The driving means is a cylinder in the illustrated example, but may use a motor. In the branch point 12A, the traveling clamp 10 is alternately distributed into a right-side first supply rail 163 and a left-side second supply rail 164. FIG. 5(b) shows that the changeover device 20 distributes the traveling clamp 10 to the right-side first supply rail 163, and FIG. 5(c) shows that the changeover device 20 distributes the traveling clamp 10 to the left-side second supply rail 164. In the merge point 12B, the traveling clamp 10 on the first supply rail 163 and the traveling clamp 10 on the second supply rail 164 are returned to the main line in a given order. FIG. 6(b) shows that the changeover device 20 is returning the traveling clamp 10 from the left-side first supply rail 163 to the main line, and FIG. 6(c) shows the changeover device 20 is returning the traveling clamp 10 from the right-side second supply rail 164 to the main line. Moreover, the changeover device 20 may be omitted in the merge point 12B. In the latter case, the traveling clamp 10 previously arrived at the merge point 12B is first merged. Therefore, there may be disposed the aforementioned driving mechanism that causes the traveling clamp 10 positioned on the particular side of the first and second supply rails 163,164 to reach and pass the merge point 12B.

It is preferable that the traveling clamp 10 on the first supply rail 163 and the traveling clamp 10 on the second supply rail 164 are independently movable to each other between the branch point 12A and the merge point 12B in the supply unit 12. Therefore, the driving mechanism (not shown) can be disposed, for example, each in the first supply rail 163 and the second supply rail 164. An example of the driving mechanism comprises a pair of pulleys, a toothed belt mounted between the pulleys, and a driving motor for rotating the pulleys. A toothed belt circling through the driving motor engages the upper face the traveling clamp 10 for example, allowing the traveling clamp 10 to move individually along the transfer rail 16. Alternatively, the traveling clamp 10 on the first supply rail 163 and the traveling clamp 10 on the second supply rail 164 can be moved independently with each other by alternately transmitting the power of one driving motor to the toothed belt for the first supply rail 163 and the toothed belt for the second supply rail 164 through a clutch. A chain may be used instead of the toothed belt.

Then, there will be described an example of using the cloth transfer apparatus in which the right corner Cr of the cloth C discharged from the supply unit 12 is transferred as the first corner antecedently and then the left corner Cl thereof is followed as the second corner, when the washed cloth C is transferred to a subsequent treatment device T. Alternately, the left corner Cl may be transferred as the first corner antecedently and the right corner Cr may be followed as the second corner.

Figure 7A:
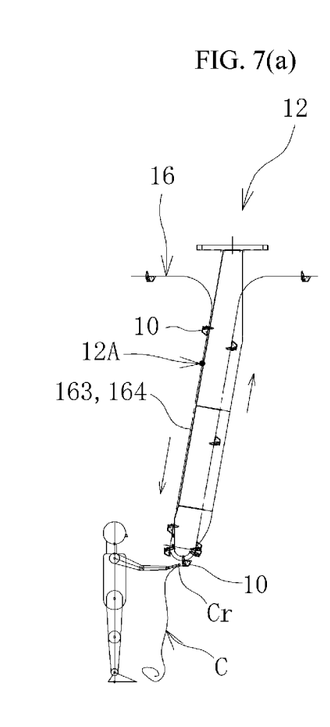
FIGS. 7(a) to 7(d) are views illustrating an operation of the cloth transfer apparatus of FIG. 1 from an attachment of a cloth to the traveling clamp to merge to the main line when the operator first finds a right corner of the cloth.
Figure 7B:
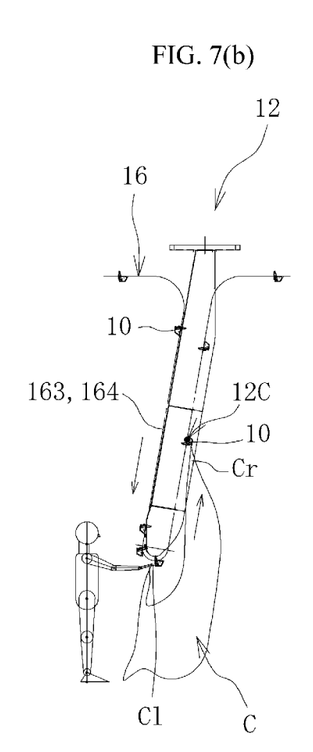
Figure 7C:
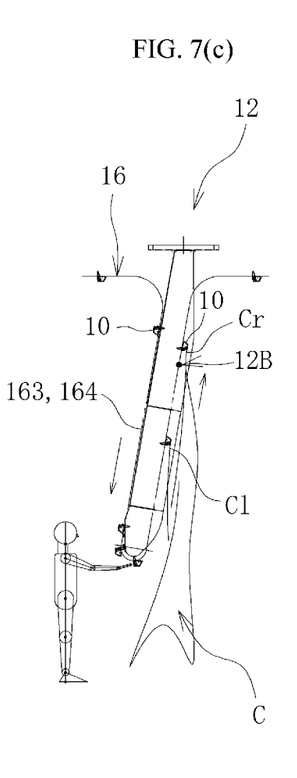
Figure 7D:
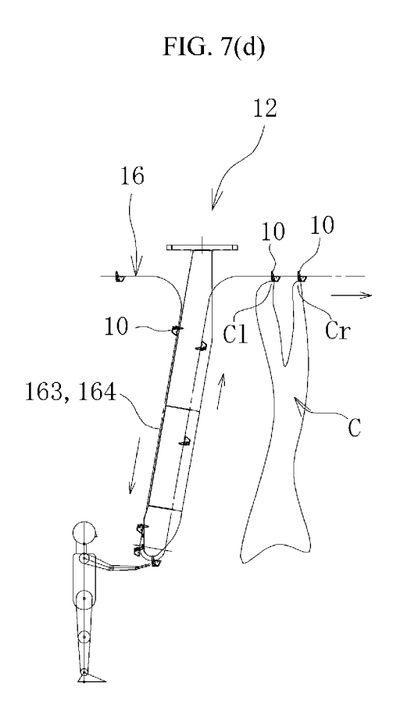

As shown in FIG. 7(a), the operator finds the right corner Cr or the left corner Cl of the particular side such as a short side of the cloth C in the supply unit 12. When finding the right corner Cr first, the operator attaches the right corner Cr to the traveling clamp 10 on the first supply rail 163 (hereinafter referred to as a first traveling clamp 10) as shown in FIG. 7(a). The first traveling clamp 10 to which the right corner Cr is attached rises antecedently up to a waiting position 12C in front of a merge position as shown in FIG. 7(b), and the left corner itself appears in front of the operator in association with the rise, and hence the operator attaches the appeared left corner Cl to the traveling clamp 10 on the second supply rail 164 (hereinafter referred to as a second traveling clamp 10). The distance that the first traveling clamp rises antecedently is preferably not more than the length of the particular side of the cloth C, more preferably the same as the length of the particular side of the cloth C. When the left corner Cl is attached to the second traveling clamp 10, the first traveling clamp 10 and the second traveling clamp 10 move forward with holding this order and alternately returned to the main line through a merge point 12B, as shown in FIG. 7(c). Thus, the cloth C discharged from the supply unit 12 is transferred toward the discharge unit 14 in an order that the right corner Cr is the leading side and the left corner Cl is the trailing side as shown in FIG. 7(d).

Figure 8A:
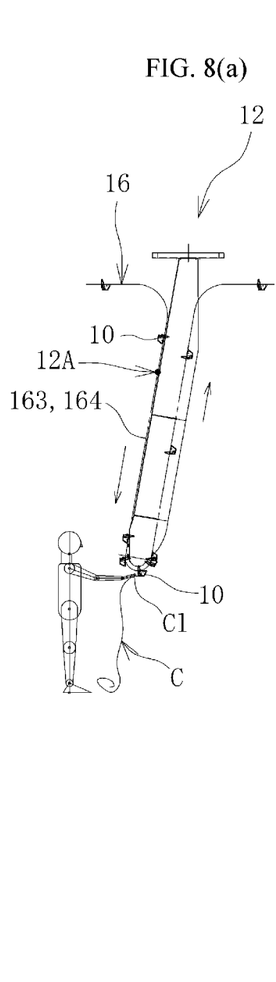
FIGS. 8(a) to 8(d) are views illustrating an operation of the cloth transfer apparatus of FIG. 1 from an attachment of a cloth to the traveling clamp to merge with the main line when the operator first finds a left corner of the cloth.
Figure 8B:
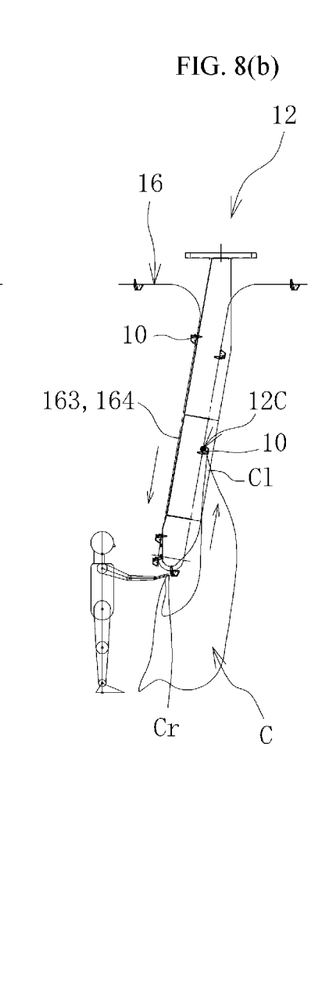
Figure 8C:
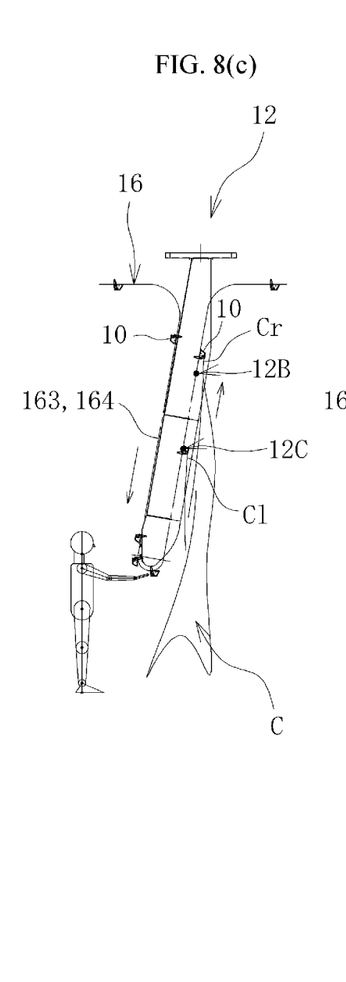
Figure 8D:
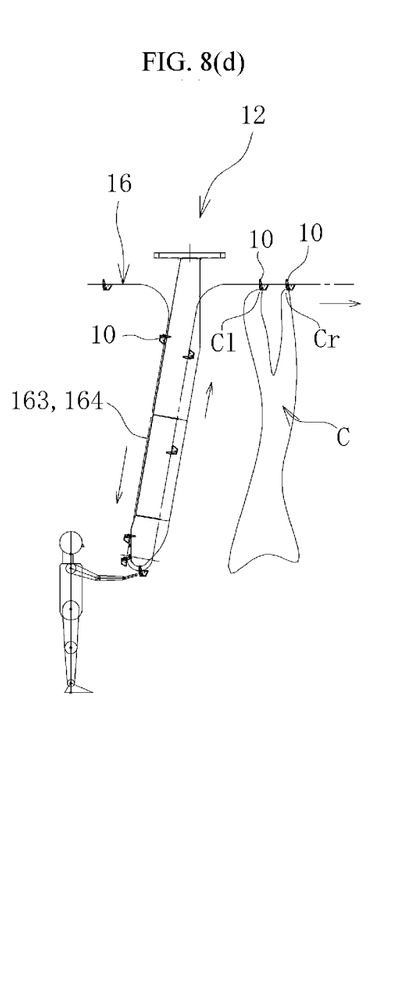

In contrast, when finding the left corner Cl of the cloth C in the supply unit 12 first, the operator attaches the left corner Cl to the second traveling clamp 10 as shown in FIG. 8(a). The second traveling clamp 10 to which the left corner Cl is attached antecedently rises up to a waiting position 12C directly before the merge position as shown in FIG. 8(b), and the right corner Cr itself appears in front of the operator in association with the rising, so that the operator attaches the appeared right corner Cr to the first traveling clamp 10. The distance that the second traveling clamp 10 antecedently rises is preferably not more than the length of the particular side of the cloth C, more preferably same as the length of the particular side of the cloth C. When the right corner Cr is attached to the first traveling clamp 10, as shown in FIG. 8(*c*), the first traveling clamp 10 moves forward, overtakes the second traveling clamp 10 that has stopped at the waiting position 12C, and returns to the main line first through the merge point 12B. Subsequently, the second traveling clamp 10 moves forward and later returns to the main line through the merge point 12B. Even in this case, therefore, the cloth C that has left the supply unit 12 is transferred toward the discharge unit 14 in an order that the right corner Cr is a leading side and the left corner Cl is a trailing side.

Thereafter, the traveling clamp 10 holding the cloth C travels toward the discharge unit 14 on the transfer rail 16 as shown in FIG. 1. The traveling clamp 10 on the leading side and the traveling clamp 10 on the trailing side are alternately distributed into the left and right first discharge rail 161 and second discharge rail 162 through the branch point 16C, directly before the discharge unit 14. Arriving at the discharge unit 14, the traveling clamp 10 delivers the held cloth C to the cloth feeding machine Ta. After delivering the cloth C to the cloth feeding machine Ta, the empty traveling clamp 10 travels on the transfer rail 16 and again returns to the supply unit 12. The traveling clamp 10 is distributed into three supply units 12 at a given ratio through the branch point 16A.

As mentioned above, the transfer rail 16 branches into the first supply rail 163 and the second supply rail 164 at the branch point 12A of the supply unit 12, and the operator can attach the one that has been first found, between the right corner Cr and left corner Cl, to the corresponding traveling clamp 10 on the first supply rail 163 or traveling clamp 10 on the second supply rail 164. Thus, it becomes unnecessary to conduct such a troublesome operation that the operator releases the firstly-found corner Cr or Cl once, finds the released corner Cr or Cl again, and attaches the corner to the corresponding clamp, and hence, the attachment of the cloth C to the traveling clamp 10 can be performed efficiently without waste.

According to a preferable example that the one to which the corner Cr or Cl is attached, between the first traveling clamp 10 and the second traveling clamp 10, antecedently rises up to the waiting position 12C, a particular opposite corner Cl or Cr itself appears in front of the operator, so that the operator can easily find the particular opposite corner Cl or Cr.

According to a further preferable example having a configuration that a particular one (e.g. first traveling clamp 10), between the first traveling clamp 10 and the second traveling clamp 10, is always returned to the main line first through the merge point 12B in a condition that the first corner (e.g. Cr) of the cloth C is attached to the first traveling clamp 10 and the second corner (e.g. C0 of the cloth C is attached to the second traveling clamp 10, the cloth C that has left the supply unit 12 can be transferred in an order that the particular corner (e.g. Cr) is a leading side and the opposite corner (e.g. C0 is a trailing side.

According to another preferable example in which there is disposed the branch point 16C that allows the transfer rail 16 to branch into the first discharge rail 161 and the second discharge rail 162 at a position directly before the discharge unit 14, the cloth C can be transferred to the right front of the cloth feeding machine Ta while avoiding an interference between the transfer rail 16 and the cloth feeding machine Ta. In this case, the traveling clamp 10 can be distributed into the first discharge rail 161 and the second discharge rail 162, in the branch point 16C disposed at the position directly before the discharge unit 14, taking into account of the directions of the front and back face of the cloth C to be discharged in the discharge unit 14. For example, instead of a method of rectifying through the merge point 12B so that the particular corner Cr, Cl is always ahead in the supply unit 12, the directions of the front and back faces of the cloth C in the discharge unit 14 may be adjusted in the branch point 16C directly before the discharge unit 14 through rectification by distribution control of the traveling clamp 10 to the first discharge rail 161 and the second discharge rail 162. Concretely, an individual management means such as IC chip, two-dimensional code or the like is mounted onto the traveling clamp 10 and information of either right or left corner held by the traveling clamp 10 is associated with the individual management means and read by a reading means in front of the merge point, whereby distribution control of the traveling clamps 10 can be conducted at the branch point 16 directly before the discharge unit 14 so as to deliver the cloth C at a particular front or rear direction to the cloth feeding machine Ta. By using the individual management means, it becomes possible to grasp the maintenance timing of the traveling clamp 10 and withdraw the cloth C in response to the difference of feeding mode in the cloth feeding machine Ta (for example, one-lane feeding mode using only the first and second discharge rails 161, 162, two-lane feeding mode using third and fourth discharge rails (not shown) in addition to the first and second discharge rails 161, 162).

Next, the cloth transfer apparatus according to another embodiment of the present invention will be described with reference to FIG. 9. In this embodiment, the same members and elements as explained in FIGS. 1-8 are designated by the same symbols and the explanation thereof is omitted, and different points are mainly described here.

Figure 9:
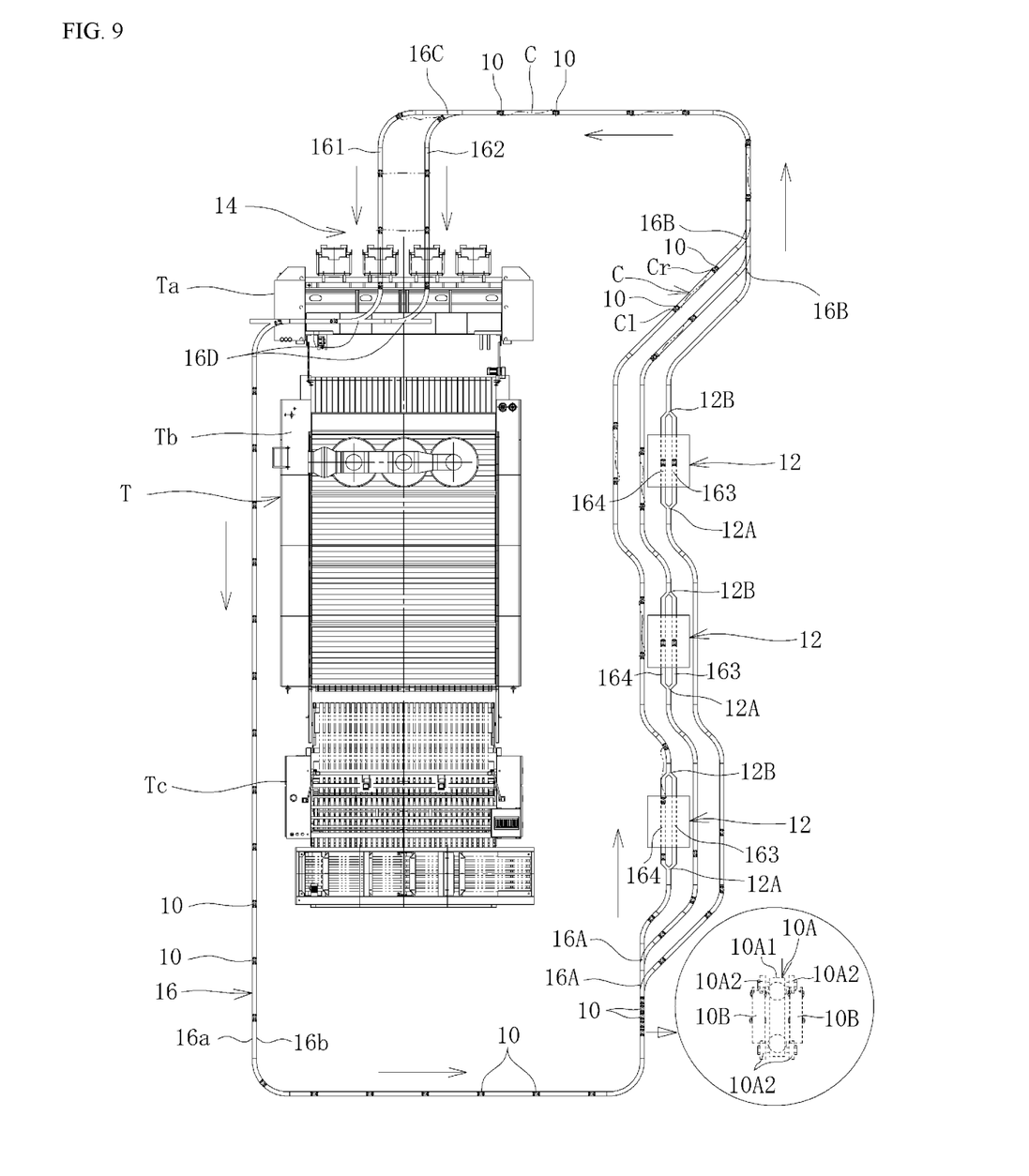
FIG. 9 is a plan view illustrating a schematic configuration of a cloth transfer apparatus according to another embodiment of the present invention.

As shown in FIG. 9, the cloth transfer apparatus 10 according to this embodiment is different from the cloth transfer apparatus 10 according to the aforementioned embodiment in a point that the branch point 12A is disposed just before the supply unit 12 (upstream side) and the merge point 12B is disposed just after the supply unit 12 (downstream side). The first and second supply rails 163, 164 are arranged side by side over a whole area of the supply unit 12 having an approximately U-shaped form viewing from side. Thus, the branch point 12A and the merge point 12B are not disposed in the supply unit 12 where the space is frequently limited, whereby an increase in size can be avoided. Moreover, the changeover device 20 as shown in FIG. 5 is disposed in the branch point 12A arranged in front of the supply unit 12. In the merge point 12B arranged after the supply unit 12, there is disposed the changeover device 20 as shown in FIG. 6, which may be omitted. In the latter case, the traveling clamp 10 firstly arrived at the merge point 12B is merged antecedently. Therefore, the aforementioned driving mechanism that allows the traveling clamp 10 positioned at the particular side to arrive at and pass the merge point 12B may be provided in the first or second supply rail 163, 164. Even in this embodiment, it is preferable to provide the waiting position 12C in the supply unit 12.

INDUSTRIAL APPLICABILITY

According to the present invention, it is possible to provide the cloth transfer apparatus which allows the operator to attach the cloth to the traveling clamp without waste even when the corner of the cloth to be attached to the traveling clamp is specified.

REFERENCE SIGNS LIST 10 traveling clamp
12 supply unit
12A branch point
12B merge point
12C waiting position
14 discharge unit
16 transfer rail
161 first discharge rail
162 second discharge rail
163 first supply rail
164 second supply rail
16A, 16C branch point
16B, 16D merge point
18 changeover device
20 changeover device
T treatment device

The invention claimed is:

1. A cloth transfer apparatus comprising:
a plurality of independent traveling clamps;
a transfer rail configured so that the plurality of independent traveling clamps circulate through a supply unit while a corner of a cloth is attached to a traveling clamp of the plurality of independent traveling clamps and circulate through a discharge unit where the cloth is delivered from the traveling clamp and configured to allow the traveling clamps to independently travel on the rail; and
in, before or after the supply unit, a branch point where the transfer rail branches into a first supply rail and a second supply rail and a merge point where the first supply rail and second supply rail merge; wherein
the plurality of traveling clamps, the first supply rail and the second supply rail are configured so that the traveling clamp is attached to the corner while the traveling clamp is in the first supply rail and a second traveling clamp of the plurality of independent traveling clamps is attached to a second corner of the cloth while the second traveling clamp is in the second supply rail.

2. The cloth transfer apparatus according to claim 1, wherein
the cloth transfer apparatus is configured so that the one of the first traveling clamp and the second traveling clamp to which the cloth has been attached, rises antecedently up to a waiting position directly before the merge point.

3. The cloth transfer apparatus according to claim 2, wherein
the one of the first traveling clamp and the second traveling clamp is always returned to a main line earlier, through the merge point, in a condition that the corner of the cloth is attached to the first traveling clamp and the second corner of the cloth is attached to the second traveling clamp.

4. The cloth transfer apparatus according to claim 3, further comprising
a second branch point where the transfer rail branches into a first discharge rail and a second discharge rail directly before the discharge unit.

5. The cloth transfer apparatus according to claim 4, wherein
the plurality of traveling clamps are distributed into the first discharge rail and the second discharge rail at the second branch point in consideration of the direction of front and back faces of the cloth discharged from the discharge unit.

6. The cloth transfer apparatus according to claim 1, wherein
the one of the first traveling clamp and the second traveling clamp is always returned to a main line earlier, through the merge point, in a condition that the corner of the cloth is attached to the first traveling clamp and the second corner of the cloth is attached to the second traveling clamp.

7. The cloth transfer apparatus according to claim 6, further comprising
a second branch point where the transfer rail branches into a first discharge rail and a second discharge rail directly before the discharge unit.

8. The cloth transfer apparatus according to claim 7, wherein
the plurality of traveling clamps are distributed into the first discharge rail and the second discharge rail at the second branch point in consideration of the direction of front and back faces of the cloth discharged from the discharge unit.

9. The cloth transfer apparatus according to claim 1, further comprising
a second branch point where the transfer rail branches into a first discharge rail and a second discharge rail directly before the discharge unit.

10. The cloth transfer apparatus according to claim 9, wherein
the plurality of traveling clamps are distributed into the first discharge rail and the second discharge rail at the second branch point in consideration of the direction of front and back faces of the cloth discharged from the discharge unit.

11. The cloth transfer apparatus according to claim 2, further comprising
a second branch point where the transfer rail branches into a first discharge rail and a second discharge rail directly before the discharge unit.

12. The cloth transfer apparatus according to claim 11, wherein
the plurality of traveling clamps are distributed into the first discharge rail and the second discharge rail at the second branch point in consideration of the direction of front and back faces of the cloth discharged from the discharge unit.

* * * * *